(12) United States Patent
Zhang et al.

(10) Patent No.: US 10,528,034 B2
(45) Date of Patent: Jan. 7, 2020

(54) ROBOTIC ADDITIVE MANUFACTURING APPARATUSES, SYSTEMS AND METHODS

(71) Applicant: ABB Schweiz AG, Baden (CH)

(72) Inventors: George Q. Zhang, Windsor, CT (US); Xiongzi Li, West Hartford, CT (US); Daniel X. Wappling, Västerås (SE); Anders Spaak, Mölndal (SE); Biao Zhang, West Hartford, CT (US); Remus Boca, Simsbury, CT (US); Thomas A. Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 123 days.

(21) Appl. No.: 15/687,201

(22) Filed: Aug. 25, 2017

(65) Prior Publication Data
US 2017/0351245 A1 Dec. 7, 2017

Related U.S. Application Data (63) Continuation of application No. PCT/US2016/019525, filed on May 25, 2016.
(Continued)

(51) Int. Cl.
*B33Y 10/00* (2015.01)
*B33Y 30/00* (2015.01)
(Continued)

(52) U.S. Cl.
CPC ........ *G05B 19/4099* (2013.01); *B25J 9/1664* (2013.01); *B25J 9/1671* (2013.01);
(Continued)

(58) Field of Classification Search
CPC .............. G05B 19/41885; G05B 17/02; G05B 19/4099; G05B 19/425;
(Continued)

(56) References Cited

U.S. PATENT DOCUMENTS

2008/0106547 A1* 5/2008 Kataoka ................ G06T 17/20
345/420
2013/0015596 A1 1/2013 Mozeika et al.
(Continued)

FOREIGN PATENT DOCUMENTS

EP 2537642 A1 12/2012

OTHER PUBLICATIONS

Zhang, et al Robotic Additive Manufacturing along Curved surface—a Step towards Free-form Fabrication, IEEE Conference on Robotics and Biomimetics, Zhuhai, China, Dec. 6-9, 2015, pp. 721-726.
(Continued)

*Primary Examiner* — Michael J Brown
(74) *Attorney, Agent, or Firm* — J. Bruce Schelkopf; Taft Stettinius & Hollister LLP (57) ABSTRACT

One exemplary embodiment is a method comprising generating robot control code from one or more files including part geometry parameters, material addition parameters, and robot system parameters. The robot control code includes instructions to control position and material output of an additive manufacturing tool adjustable over six degrees of freedom. The method includes simulating execution of the robot control code to generate a virtual part file including virtual part geometry parameters and material addition parameters, analyzing the virtual part geometry parameters and material addition parameters relative to the one or more files, and executing the robot control code with the controller to produce the part with robot system if the analyzing indicates that the virtual part satisfies one or more conditions.

20 Claims, 3 Drawing Sheets

Related U.S. Application Data (60) Provisional application No. 62/120,481, filed on Feb. 25, 2015.

(51) Int. Cl.
*B33Y 50/02* (2015.01)
*G05B 19/4099* (2006.01)
*B25J 9/16* (2006.01)
*G05B 17/02* (2006.01)

(52) U.S. Cl.
CPC .............. *B33Y 10/00* (2014.12); *B33Y 30/00* (2014.12); *B33Y 50/02* (2014.12); *G05B 2219/35134* (2013.01); *G05B 2219/49007* (2013.01)

(58) Field of Classification Search
CPC ........... G05B 2219/32343; G05B 2219/32357; G05B 2219/33286; G05B 2219/49007; G05B 2219/50391

USPC ............................................. 700/30, 98, 248
See application file for complete search history.

(56) References Cited

U.S. PATENT DOCUMENTS

| | | |
|---|---|---|
| 2014/0117586 A1 | 5/2014 | Bonassar et al. |
| 2014/0277661 A1 | 9/2014 | Amadio et al. |
| 2014/0277679 A1 | 9/2014 | Weinberg et al. |
| 2014/0284832 A1 | 9/2014 | Novikov et al. |

OTHER PUBLICATIONS

International Search Report and Written Opinion, PCT/US2016/019525, ABB Technology AG, dated Jun. 30, 2016, 12 pages.

* cited by examiner

ROBOTIC ADDITIVE MANUFACTURING APPARATUSES, SYSTEMS AND METHODS

BACKGROUND

The present disclosure relates generally to robotic additive manufacturing (RAM) apparatuses, systems, methods. Additive manufacturing includes a number of processes which are used to make or modify three dimensional parts by controlling the position and outputting of additive material. 3D printing is one example of an additive manufacturing technology in which additive material is deposited by a tool under computer control to produce a part. Conventional 3D printing is limited in that it can control the tool only over three degrees of freedom. Additive manufacturing systems including a robotic arm that can control a tool over six degrees of freedom (e.g., X, Y and Z axis translation and pitch, yaw and roll rotation) have been proposed. Heretofore, additive manufacturing techniques have suffered from a number of disadvantages and drawbacks including those respecting variation in the produced part from the intended part design as well as process time and cost to name several examples. These disadvantages and drawbacks may be particularly acute for parts for which precision and accuracy are at a premium but may impact production of other parts as well. There remains a significant need for the unique apparatuses, systems, methods disclosed herein.

SUMMARY OF THE DISCLOSURE

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

One exemplary embodiment is a method comprising generating robot control code from one or more files including net part geometry parameters, material addition parameters, and robot system parameters. The robot control code includes instructions to control position and material output of an additive manufacturing tool adjustable over six degrees of freedom. The method includes simulating execution of the robot control code to generate a virtual part file including virtual part net geometry parameters and material addition parameters, analyzing the virtual part net geometry parameters and material addition parameters relative to the one or more files, and executing the robot control code with the controller to produce the part with robot system if the analyzing indicates that the virtual part satisfies one or more conditions.

DETAILED DESCRIPTION OF ILLUSTRATIVE EMBODIMENTS

Figure 1:
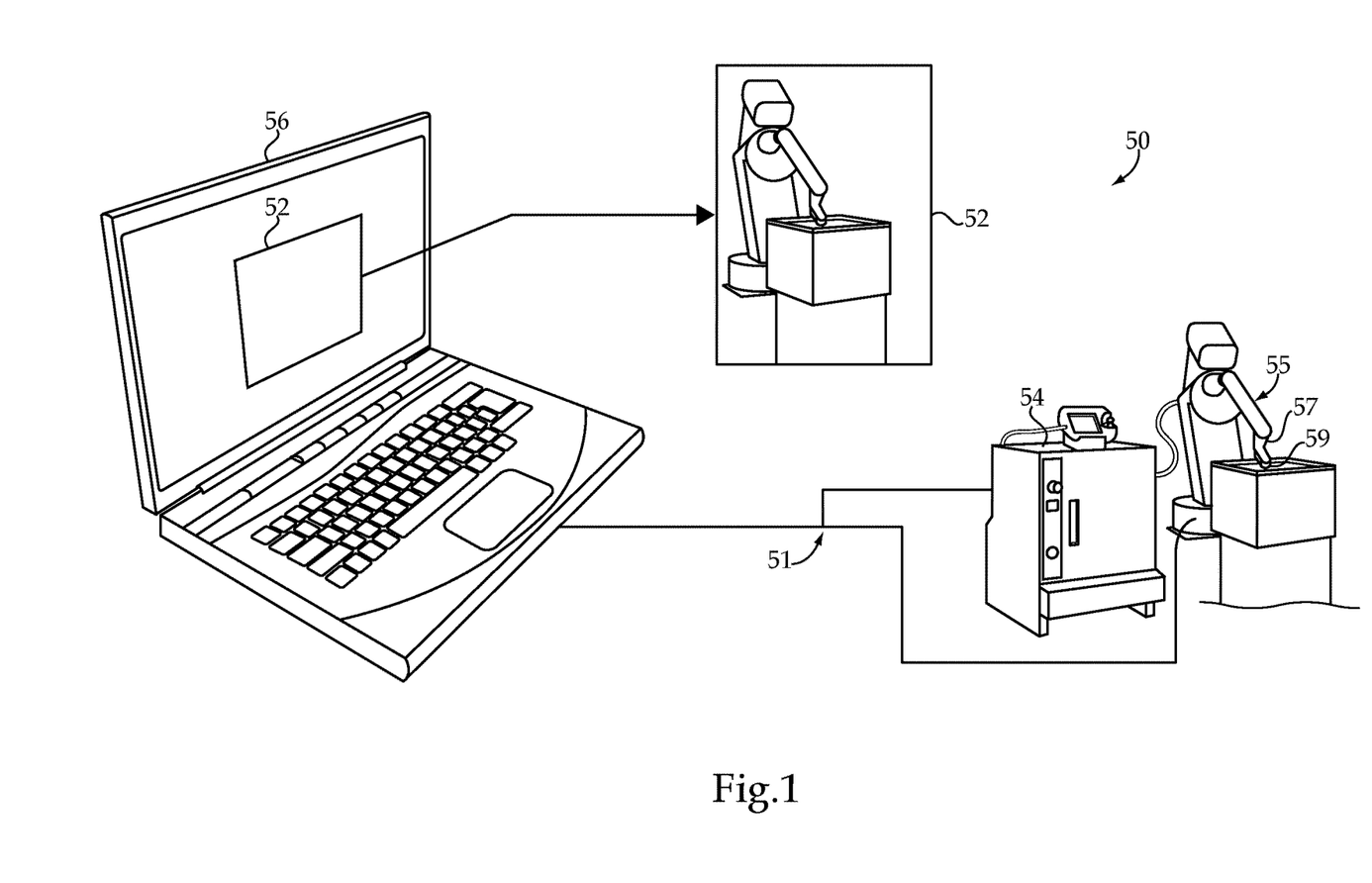
FIG. 1 illustrates certain aspects of an exemplary robotic additive manufacturing (RAM) system.

With reference to FIG. 1, there is illustrated an exemplary robotic additive manufacturing (RAM) system 50 which includes a computing device 56 structured to generate robot control code from one or more input files. The one or more input files may collectively or individually include net part geometry parameters (e.g. part dimension and/or shape information), material addition parameters, and robot system parameters. The generated robot control code includes instructions to control position and material output of an additive manufacturing tool adjustable by the robot system over six degrees of freedom (e.g., X, Y and Z axis translation and pitch, yaw and roll rotation).

Computing device 56 is structured to perform a simulation 52 which simulates execution of the robot control code by a robot controller. The simulation may be used to generate a virtual part file including virtual part net geometry parameters and virtual part material addition parameters. Computing device 56 is further structured to analyze the virtual part net geometry parameters relative to the net part geometry parameters of the one or more files and to analyze the virtual part material addition parameters relative to the material addition parameters of the one or more files. If the analysis indicates that the virtual part satisfies one or more conditions, the robot code may be validated and provided for execution to produce a tangible part. If the analysis indicates that the virtual part does not satisfy one or more conditions, the computing device 56 may be operated to modify the one or more input files to generate second robot control code. The simulation and analysis operations may then be performed by the computing device using the second robot control code. The analysis conditions may comprises conditions on variation on geometric and/or material addition path information between the virtual part and corresponding information in the one or more input files and may additionally or alternatively include conditions placed on the model for evaluating mechanical, thermal and/or electrical characteristics of the virtual part such as by finite element analysis modeling.

RAM system 50 includes a robot controller 54 which can receive the validated robot control code and execute it to control robotic arm 55 to produce a tangible part. Computing device 52 is in operative communication with robot controller 54 and robot 55 via one or more communication links 51, which may comprise wired, optical, and/or wireless communication links such that computing device 52 can provide validated robot control code to robot controller 54, receive communication from robot controller, and provide and receive information to one or more devices associates with robot 55 such as one or more cameras.

In the illustrated embodiment robot 55 includes a robotic arm 55 which is operatively coupled with an additive manufacturing tool 59 and operable to control the position of additive manufacturing tool 59 over six degrees of freedom. It is contemplated that tool 59 may comprise a number of additive manufacturing tools including, for example, extrusion type printing heads, additive welding tools, direct metal deposition (DMD) tools, and laser engineered net shaping lenses (LENS) tools, among others. It is further contemplated that a variety of additive materials may be utilized in connection with tool 59 including plastics such as ABS, PLA and others as well as a number of powdered metals.

In the illustrated embodiment, computing device 52 is structured as a PC laptop, however, it is contemplated that a variety of types and configurations of computing devices may be utilized. Additionally, while computing device 52 and robot controller 54 are illustrated as physically distinct devices, they may also be structured to share common resources or may be implemented together in the same computing device or system.

Figure 2:
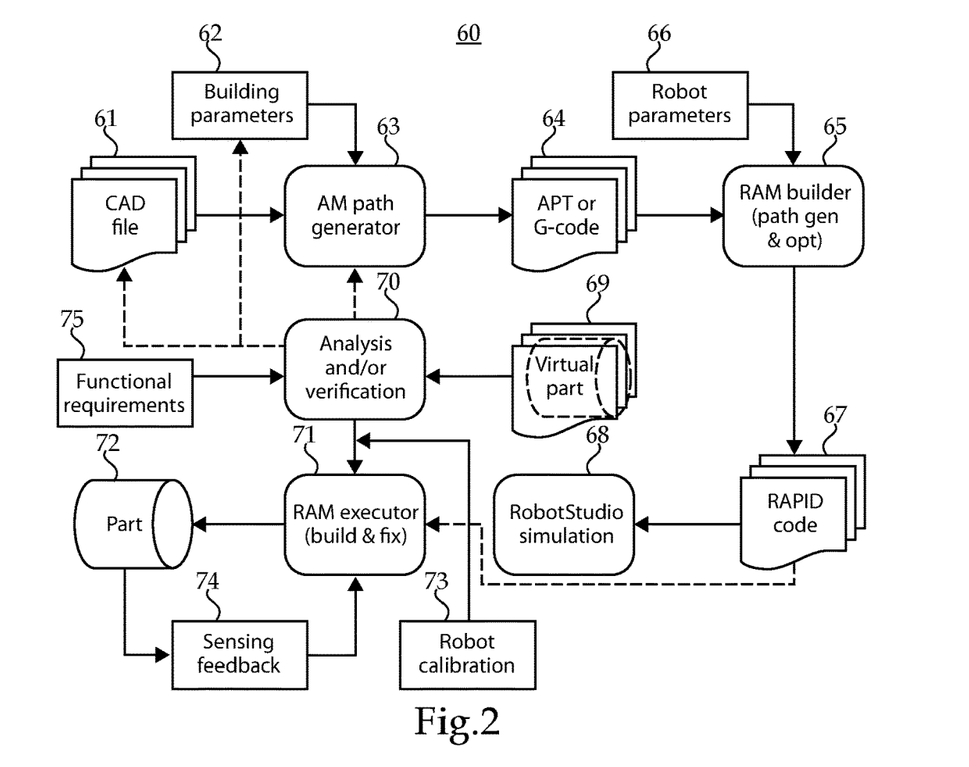
FIG. 2 illustrates certain aspects of an exemplary process performed by a RAM system.

With reference to FIG. 2, there is illustrated a schematic block diagram according to an exemplary process 60 which may be performed by a RAM system such as system 50 described above in connection with FIG. 1. Process 60 may be structured to provide a first software platform for generating robot control code, simulating execution of the code, and analyzing, optimizing and validating the code as well as a second software platform for executing the robot control code to produce a tangible part. The first platform may be an offline platform such the RobotStudio platform available from ABB. The second platform may be any of a number of robot control software platforms.

Process 60 receives as input information from CAD file 61, building parameters file 62 and a robot parameters file 66. CAD file 61 and building parameters file 62 are loaded into an additive manufacturing path generator 63 which is structured to output path code 64. Path code 64 may be in the format of a variety of additive manufacturing path codes, for example, Automatically Programmed Tool (APT) code, G-code, or other code types and formats. In certain embodiments manufacturing path generator 63 may be structured to generate path code 64 by dividing the part provided by CAD file 64 into layers or other sections and specifying one or more material addition paths for respective layers. In certain embodiments the building parameters file 62 may define layers that is generally flat and parallel to one another. In certain embodiments the building parameters file 62 may define as free-form structure with layers that follow curved surfaces, which requires multiple angles for orientation of a material addition tool, e.g., angled printing CAD file 61 includes dimensional parameters for a part to be produced, for example, net part geometry parameters. In certain embodiments CAD file 61 may include only dimensional parameters for a part to be produced. In certain embodiments CAD file 61 may also include other information about the part, such as material composition and material characteristic parameters, for example, molecular composition, strength, electrical characteristics, and/or thermal characteristics. While the term CAD file is used to refer to a variety of file types and formats, it should be appreciated that the same or similar information may also be provided through various other inputs such as databases, or other computer-readable information formats all of which may be considered files.

Building parameters file 62 includes parameters relating to a particular additive manufacturing process, technique and/or equipment. Such information may include additive material parameters such as material type and property parameters, for example, continuous carbon fiber, multiple layer, and weaved additive manufacturing (AM) parameters. Such information may include the geometric dimensions of a material addition path (e.g., the shape and size of the structure resulting from material addition over a given distance), information about an additive manufacturing tool (e.g., nozzle or extruder dimensions, output or extrusion temperature, and/or layer thickness), information about the material composition and characteristic of the additive material (e.g., molecular composition, strength, electrical characteristics, and/or thermal characteristics), information about the interface between additive material (e.g., adhesion, stress transfer, electrical, and/or thermal characteristics) among other information. While the term building parameters file is used to refer to a variety of file types and formats, it should be appreciated that the same or similar information may also be provided through various other inputs such as databases, or other computer-readable information formats all of which may be considered files.

Path code 64 output by additive manufacturing path generator 63 is provided to robotic additive manufacturing builder 65 along with robot parameters file 66. Robotic additive manufacturing builder (path generation and optimization) 65 converts the APT or g-code 64 into robot control instructions (program) such as robot control code 67. Builder 65 may determine parameters for controlling the position and path followed by a robotic additive manufacturing tool and may optimize the position and path parameters using information from robot parameters file 66. Optimization may account for information of the robot or robotic arm configuration, size, position, and operating environment of the robot as well as the characteristics of other hardware such as a positioner, the singularity and reachability of the robotic systems which may be multiple robots, and positioner and track combined information. One example of a robot control code format is the RAPID program code available from ABB. Robot control code 67 may include embedded process parameters including parameters from CAD file 61, building parameters file 62, and robot parameters file 66, or combinations thereof.

Robot parameters file 66 includes parameters relating to a robot system, for example, robot size, configuration, mounting, placement, work cell or environment, and/or other information. While the term robot parameters file is used to refer to a variety of file types and formats, it should be appreciated that the same or similar information may also be provided through various other inputs such as databases, or other computer-readable information formats all of which may be considered files.

It shall be appreciated that the illustrated embodiment is one non-limiting example of how a computing system or systems can be structured to produce robot control code. A number of alternate system structures and configurations are contemplated. In certain embodiments, robot control code can be generated directly from the CAD file with building parameters and/or robot parameters so that the intermediate step of APT or G-code generation 64 is omitted.

Robot control code 67 is provided to RAM simulator 68 which is structured to simulate the execution of robot control code by a controller to control a robot to produce a part. One example of a RAM simulator is RobotStudio platform available from ABB. Simulator 68 simulates execution of robot control code create virtual part 69 with the geometrical and building structure information. The virtual part may include information of the net part geometry, building path geometry, and the visual look of the part to be built. The information on material composition and characteristics and the additive layers or portions will be provided by building parameters file 62. Simulator 68 is one example of a simulation engine which may be utilized to simulate execution of robot control code by an actual robot controller to control an actual robot.

The virtual part 69 is provided to analysis and verification block 70 which is structured to perform analysis, optimization and verification operations using the virtual part. The analysis operations may include comparison of virtual part dimensional information such as virtual part net geometry with corresponding information from CAD file 61, and comparison of building information such as bead dimensions and orientation relative corresponding information in building parameters file 62. One or more criteria may be established for the variation between compared information to analyze the compliance with or variation of the virtual part with the intended design. Such variation maybe introduced by simulation of the actual operation of the robot and/or extrusion tool. The analysis operations can also include model based analysis of structural, mechanical, thermal, and/or electrical characteristics of the virtual part 69 which may be performed using a finite element analysis (FEA) tool or other modeling techniques. The results of the modeling may be comparted to one or more criteria established by the design and functional requirements 75 of the part. For example, if the part is required to have higher tensional strength in a particular direction, the building path, that is the path for accumulating material in that direction on the virtual can be designed to be along that particular direction since the structural strength will be higher in that direction.

If one or more criteria or conditions established for analysis and verification block 70 are not satisfied, the inputs to process 60 may be modified. Such modification may comprise changes or adjustments to file 61, file 62, and/or file 66. The modifications or changes may be determined and applied by execution of software using predetermined design changes algorithms, by operator intervention, or a combination thereof.

If one or more criteria or conditions established for analysis and verification block 70 are satisfied, robot control code 67 is provided to an actual robot controller, for example, RAM Executor 71 or controller 54, to build a tangible part 72 using the robot control code 67. Before executing the robot control code 67 on the actual robotic hardware, the robot cell may be calibrated to match the virtual simulation and the actual AM execution environment. Thus, robot calibration block 73 may be used.

During the part building, a real-time quality sensing device can be used to provide feedback 74 to the robot controller to modify the building process to fix the part 72 as it is built if defects are found. Ultimately the part 72 is built and the CAD-to-part robotic additive manufacturing can be realized for a specific additive manufacturing process such as extrusion-based nonmetallic part and arc-welding based metallic part building as well as surface circuitry 3D printing.

If only small design changes have been made or the operator has enough confidence in the robotic additive manufacturing process, on or more aspects or all aspects of the simulation and analysis/verification operations can be skipped on subsequent iterations and the robot program generated 67 can be directly loaded into robotic additive manufacturing executor 71 for part production.

The above description provides several examples of RAM systems and processes that utilizes a part design and building parameters inputs to generate robot control code, optimizes the robot control code based on the robotic system used, simulates the part building process to generate a virtual part, verifies the virtual part against the CAD model, building parameter and/or other criteria, and calibrates the robot system and build the part. Further aspects of the additional parts can be complex components and structures such as wind turbine blades, lightweight car bodies and UAVs (unmanned Aerial Vehicles).

Figure 3:
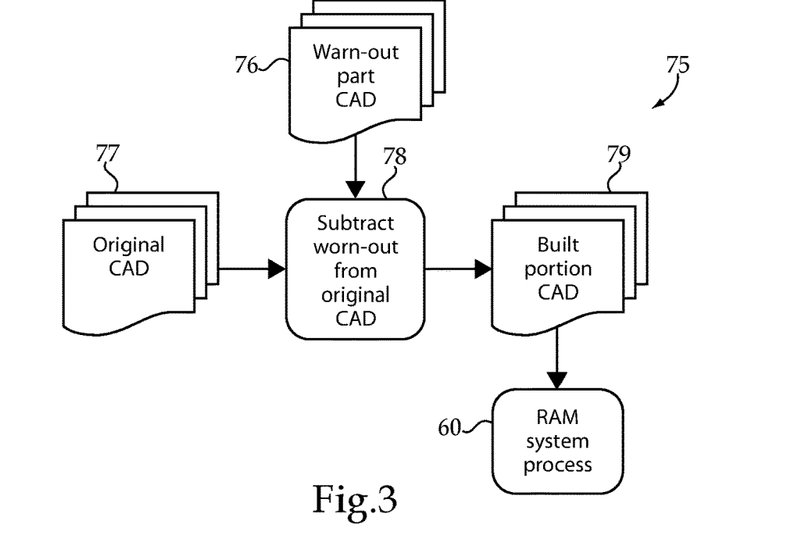
FIG. 3 illustrates certain aspects of an exemplary process for generating part repair input information for a RAM system.

The RAM systems and processes disclosed herein can be used for repairing a part that has been worn out or otherwise damaged or deformed. With reference to FIG. 3 there is illustrated a schematic block diagram according to an exemplary process 75 for generating part repair input information for a RAM system process. In this example the RAM system and process provide additive material on top of an existing part to arrive back at an original part geometry provided in a CAD model 77. Techniques such as 3D scanning or other reengineering methods are used to obtain a CAD model 76 including the actual geometry of the part to be rebuilt. Operator 78 is structured to subtract the CAD model 76 from CAD model 77 to generate a repair CAD model 79 including the geometry of the material to be added to repair or restore the part to its original design. CAD model 79 the be provided as an input to process 60 or anther RAM system process.

Figure 4:
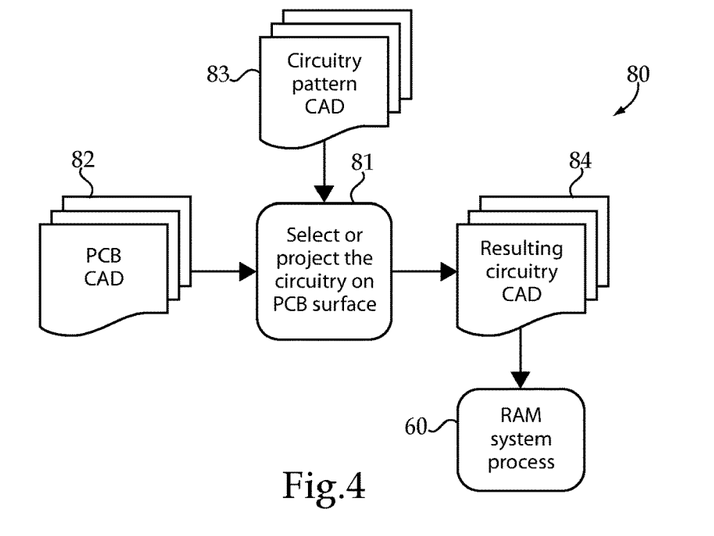
FIG. 4 illustrates certain aspects of an exemplary process for generating surface circuitry printing input information for a RAM system.

With reference to FIG. 4 there is illustrated a schematic block diagram according to an exemplary process 80 for generating surface circuitry printing input information for a RAM system process. In the case of surface circuitry printing a material addition path is created on the surface of an existing substrate such as a printed circuit board (PCB) or another type of substrate. Depending on how the circuitry is designed and presented, the robot path is generated by operator 81 using the PCB CAD model 82 and a circuitry pattern CAD model 83. Operator 81 may select or project the circuitry pattern CAD model 83 onto a surface of the PCB CAD model 82 to produce a CAD model 84 for the resulting circuitry path on substrate which provided as an input to process 60 or anther RAM system process.

Figure 5:
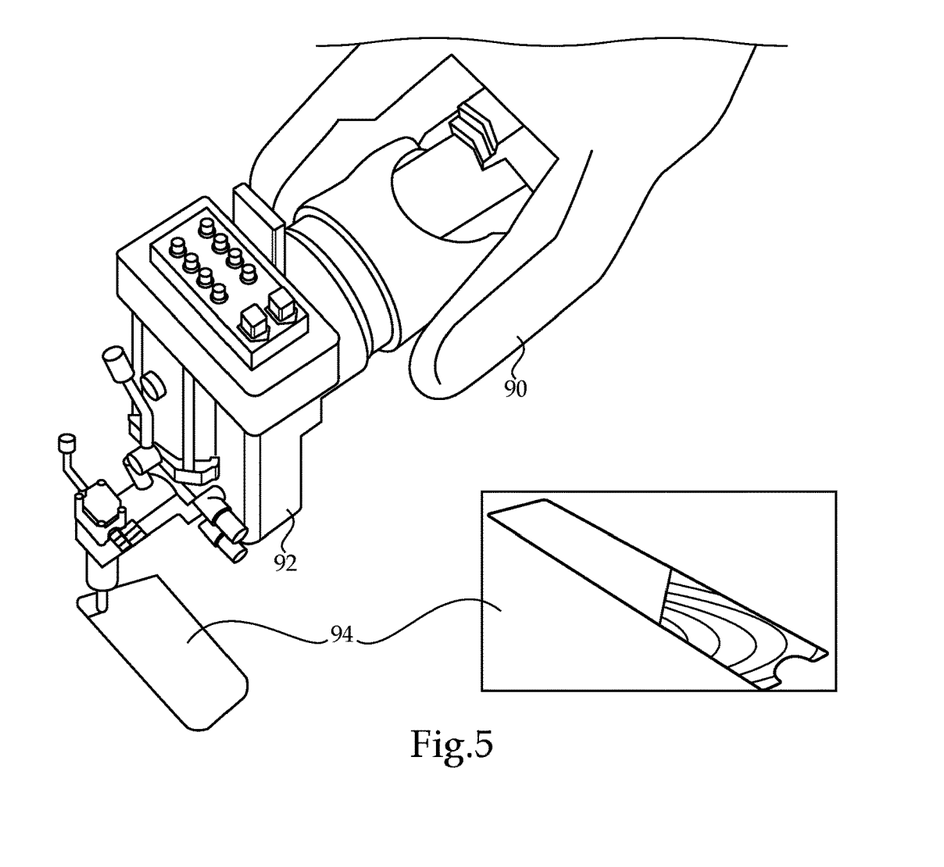
FIG. 5 illustrates certain aspects of an exemplary simulation process performed by a simulated RAM system.

With reference to FIG. 5, there is illustrated one example of a simulation executing robot control code to produce a virtual part. After robot control code generation a simulation receives the validated control code and simulates its execution by a controller structured to control a robotic arm 90 and printing head 92 to generate a virtual part 94. The virtual part 94 contains the geometry and building process information, which can be used in part analysis and design-building optimization.

A number of further exemplary embodiments shall now be described. One exemplary embodiment is a method comprising generating robot control instructions using one or more inputs providing part geometry information and addition path information for a part, the robot control instructions executable by a robot controller to control a robot including a robotic arm and an additive manufacturing tool coupled with the robotic arm, the instructions including instructions to control position of the additive manufacturing tool and operation of the additive manufacturing tool to output additive material to produce the part; operating an additive manufacturing simulation engine to execute the robot control instructions effective to generate a virtual part, the virtual part including virtual part geometry information and virtual part addition path information indicating characteristics of a material addition path resulting from execution of the robot control instructions by the simulation engine, at least one of the virtual part geometry information varying from the geometry information provided by the one or more inputs and the virtual part addition path information varying from the addition path information provided by the one or more inputs; analyzing the virtual part geometry information and the virtual part addition path information relative to the one or more inputs; if the analyzing indicates that the virtual part does not satisfy one or more conditions repeating the generating with a change to the one or more inputs to generate modified robot control instructions, repeating the operating with the modified robot control instructions to generate a second virtual part; and if the analyzing indicates that the virtual part satisfies the one or more conditions, operating the robot controller to execute the robot control instructions to create a tangible part.

In certain forms of the foregoing method the one or more inputs comprise CAD parameters defining a net part geometry, building parameters defining material addition path characteristics, and robot parameters defining characteristics of the robot. In certain forms the generating comprises processing the CAD parameters and the building parameters to generate path code defining a plurality of layers and a corresponding plurality of material addition paths and processing the robot parameters and the path code to generate the robot control instructions. In certain forms the analyzing includes comparing a net geometry of the virtual part with the CAD parameters and comparing one or more addition path characteristics of the virtual part with the building parameters. In certain forms the analyzing includes operating a modeling engine to model one or more of mechanical characteristics, thermodynamic characteristics, and electrical characteristics of the virtual part and evaluating the modeled characteristics relative to one or more criteria. In certain forms the one or more inputs comprise robot parameters defining characteristics of the robot. In certain forms the additive manufacturing tool is adjustable in six degrees of freedom by the robotic arm.

Another exemplary embodiment is a system comprising: a code generator structured to automatically generate robot control code from a plurality of user-provided input parameters defining a net geometry for a part, a material addition path for the part, and characteristics of a robot system, the robot control code including instructions for producing a tangible part by controlling a robot and an additive manufacturing device adjustable by the robot; a part production simulator structured to receive and execute the robot control code to produce a virtual part including virtual part net geometry characteristics and virtual part material addition path characteristics, at least one of the virtual part net geometry characteristics deviating from the net geometry defined by the input parameters and the virtual part material addition path characteristics deviating from the material addition path defined by the input parameters; and a part analyzer structured to analyze the virtual part relative to one or more criteria, if the one or more criteria are not satisfied modify one or more of the input parameters, re-execute the robot control code to generate a second virtual part and re-evaluate the second virtual part relative to the one or more criteria, and if the one or more conditions are satisfied provide the robot control code for execution by the robot system to operate the robot and the device to create the tangible part.

In certain forms of the foregoing system the part analyzer is structured to evaluate deviation of the virtual part net geometry characteristics from the net geometry defined by the input parameters relative to a first limit and deviation of the virtual part material addition path characteristics from the material addition path defined by the input parameters relative to a second limit. In certain forms the part analyzer is structured to model one or more of a mechanical characteristic, a thermodynamic characteristic, and an electrical characteristic of the virtual part and to evaluate the modeled characteristics relative to one or more model criteria. In certain forms the part analyzer is structured to model said one or more of the mechanical characteristic, the thermodynamic characteristic, and the electrical characteristic using a finite element analysis tool. In certain forms the part production simulator is structured to generate path code defining a plurality of layers and a corresponding plurality of material addition paths. Certain forms further comprise the robot system including a robotic arm, an additive manufacturing tool coupled with the robotic arm, and a robot controller structured to execute the robot control code to produce the tangible part. In certain forms the code generation system and the simulation system are configured as subsystems of a common computing system.

A further exemplary embodiment is a method comprising: generating robot control code from one or more files including part geometry parameters, material addition parameters, and robot system parameters, the robot control code including instructions to control position and material output of an additive manufacturing tool adjustable over six degrees of freedom by the robot system; simulating execution of the robot control code by a controller of the robot system to generate a virtual part file, the virtual part file including virtual part geometry parameters and virtual part material addition parameters; analyzing the virtual part net geometry parameters relative to the part geometry parameters of the one or more files and the virtual part material addition parameters relative to the material addition parameters of the one or more files; and executing the robot control code with the controller to produce the part with robot system if the analyzing indicates that the virtual part satisfies one or more conditions.

In certain forms of the foregoing method if the analyzing indicates that the virtual part does not satisfy the one or more conditions, repeating the generating with a change to the one or more files to generate second robot control code, repeating the simulating with the second robot control code to generate a second virtual part file and repeating the analyzing relative to the second virtual part file. In certain forms the one or more files comprise a CAD file, a building parameter file, robot system parameter file. In certain forms the generating comprises processing the CAD file and the building parameter file to generate intermediate code defining one or more layers and a corresponding one or more material addition paths. In certain forms the generating comprises processing the intermediate code and the robot system parameter file to generate the robot control code. In certain forms the analyzing includes modeling one or more of mechanical characteristics, thermodynamic characteristics, and electrical characteristics of the virtual part.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
generating robot control instructions using one or more inputs providing part geometry information and addition path information for a part, the robot control instructions executable by a robot controller to control a robot including a robotic arm and an additive manufacturing tool coupled with the robotic arm, the instructions including instructions to control position of the additive manufacturing tool and operation of the additive manufacturing tool to output additive material to produce the part;
operating an additive manufacturing simulation engine to execute the robot control instructions effective to generate a virtual part, the virtual part including virtual part geometry information and virtual part addition path information indicating characteristics of a material addition path resulting from execution of the robot control instructions by the simulation engine, at least one of the virtual part geometry information varying from the geometry information provided by the one or more inputs and the virtual part addition path information varying from the addition path information provided by the one or more inputs;
analyzing the virtual part geometry information and the virtual part addition path information relative to the one or more inputs;
if the analyzing indicates that the virtual part does not satisfy one or more conditions repeating the generating with a change to the one or more inputs to generate modified robot control instructions, repeating the operating with the modified robot control instructions to generate a second virtual part; and
if the analyzing indicates that the virtual part satisfies the one or more conditions, operating the robot controller to execute the robot control instructions to create a tangible part.

2. The method of claim 1 wherein the one or more inputs comprise CAD parameters defining a net part geometry, building parameters defining material addition path characteristics, and robot parameters defining characteristics of the robot.

3. The method of claim 2 wherein the generating comprises processing the CAD parameters and the building parameters to generate path code defining a plurality of layers and a corresponding plurality of material addition paths and processing the robot parameters and the path code to generate the robot control instructions.

4. The method of claim 2 wherein the analyzing includes comparing a net geometry of the virtual part with the CAD parameters and comparing one or more addition path characteristics of the virtual part with the building parameters.

5. The method of claim 1 wherein the analyzing includes operating a modeling engine to model one or more of mechanical characteristics, thermodynamic characteristics, and electrical characteristics of the virtual part and evaluating the modeled characteristics relative to one or more criteria.

6. The method of claim 1 wherein the one or more inputs comprise robot parameters defining characteristics of the robot.

7. The method of claim 1 wherein the additive manufacturing tool is adjustable in six degrees of freedom by the robotic arm.

8. A system comprising:
a code generator structured to automatically generate robot control code from a plurality of user-provided input parameters defining a net geometry for a part, a material addition path for the part, and characteristics of a robot system, the robot control code including instructions for producing a tangible part by controlling a robot and an additive manufacturing device adjustable by the robot;
a part production simulator structured to receive and execute the robot control code to produce a virtual part including virtual part net geometry characteristics and virtual part material addition path characteristics, at least one of the virtual part net geometry characteristics deviating from the net geometry defined by the input parameters and the virtual part material addition path characteristics deviating from the material addition path defined by the input parameters; and
a part analyzer structured to analyze the virtual part relative to one or more criteria, if the one or more criteria are not satisfied modify one or more of the input parameters, re-execute the robot control code to generate a second virtual part and re-evaluate the second virtual part relative to the one or more criteria, and if the one or more conditions are satisfied provide the robot control code for execution by the robot system to operate the robot and the device to create the tangible part.

9. The system of claim 8 wherein the part analyzer is structured to evaluate deviation of the virtual part net geometry characteristics from the net geometry defined by the input parameters relative to a first limit and deviation of the virtual part material addition path characteristics from the material addition path defined by the input parameters relative to a second limit.

10. The system of claim 8 wherein the part analyzer is structured to model one or more of a mechanical characteristic, a thermodynamic characteristic, and an electrical characteristic of the virtual part and to evaluate the modeled characteristics relative to one or more model criteria.

11. The system of claim 10 wherein the part analyzer is structured to model said one more of the mechanical characteristic, the thermodynamic characteristic, and the electrical characteristic using a finite element analysis tool.

12. The system of claim 8 wherein the part production simulator is structured to generate path code defining a plurality of layers and a corresponding plurality of material addition paths.

13. The system of claim 8 further comprising the robot system including a robotic arm, an additive manufacturing tool coupled with the robotic arm, and a robot controller structured to execute the robot control code to produce the tangible part.

14. The system of claim 8 wherein the code generation system and the simulation system are configured as subsystems of a common computing system.

15. A method comprising:
generating robot control code from one or more files including part geometry parameters, material addition parameters, and robot system parameters, the robot control code including instructions to control position and material output of an additive manufacturing tool adjustable over six degrees of freedom by the robot system;
simulating execution of the robot control code by a controller of the robot system to generate a virtual part file, the virtual part file including virtual part geometry parameters and virtual part material addition parameters;

analyzing the virtual part net geometry parameters relative to the part geometry parameters of the one or more files and the virtual part material addition parameters relative to the material addition parameters of the one or more files; and executing the robot control code with the controller to produce the part with robot system if the analyzing indicates that the virtual part satisfies one or more conditions.

16. The method of claim 15 comprising if the analyzing indicates that the virtual part does not satisfy the one or more conditions, repeating the generating with a change to the one or more files to generate second robot control code, repeating the simulating with the second robot control code to generate a second virtual part file and repeating the analyzing relative to the second virtual part file.

17. The method of claim 1 wherein the one or more files comprise a CAD file, a building parameter file, robot system parameter file.

18. The method of claim 17 wherein the generating comprises processing the CAD file and the building parameter file to generate intermediate code defining one or more layers and a corresponding one or more material addition paths.

19. The method of claim 18 wherein the generating comprises processing the intermediate code and the robot system parameter file to generate the robot control code.

20. The method of claim 17 wherein the analyzing includes modeling one or more of mechanical characteristics, thermodynamic characteristics, and electrical characteristics of the virtual part.

* * * * *